(No Model.)  2 Sheets—Sheet 2.

P. HERDIC.
TWO WHEELED VEHICLE.

No. 259,310. Patented June 13, 1882.

WITNESSES
Wm. A. Skinkle
Jos. S. Latimer

INVENTOR
Peter Herdic
By his Attorneys
Baldwin, Hopkins & Peyton

UNITED STATES PATENT OFFICE.

PETER HERDIC, OF PHILADELPHIA, PENNSYLVANIA.

TWO-WHEELED VEHICLE.

SPECIFICATION forming part of Letters Patent No. 259,310, dated June 13, 1882.

Application filed September 19, 1881. (No model.)

*To all whom it may concern:*

Be it known that I, PETER HERDIC, of the city of Philadelphia, in the State of Pennsylvania, have invented certain new and useful Improvements in Two-Wheeled Vehicles, of which the following is a specification.

My invention relates to improvements in two-wheeled vehicles, especially passenger vehicles or cabs of the class shown by United States Letters Patent No. 242,318, granted to me May 31, 1881.

My objects mainly are to obviate the shaking motion or lessen the jolting of a two-wheeled vehicle by the movements of the draft-animal, and to relieve the animal of the repeated blows ordinarily inflicted by the violent vibrations of the shafts and load.

My improvements consist in a novel organization of parts and in certain combinations of devices, hereinafter fully described preparatory to a specific designation of the subject-matter claimed.

In the accompanying drawings my improvements are illustrated as embodied in a vehicle generally resembling that patented to me as aforesaid. My improvements, or essential and co-operating parts thereof, may, however, be advantageously used under some circumstances in connection with other suitable vehicles.

Figure 1:
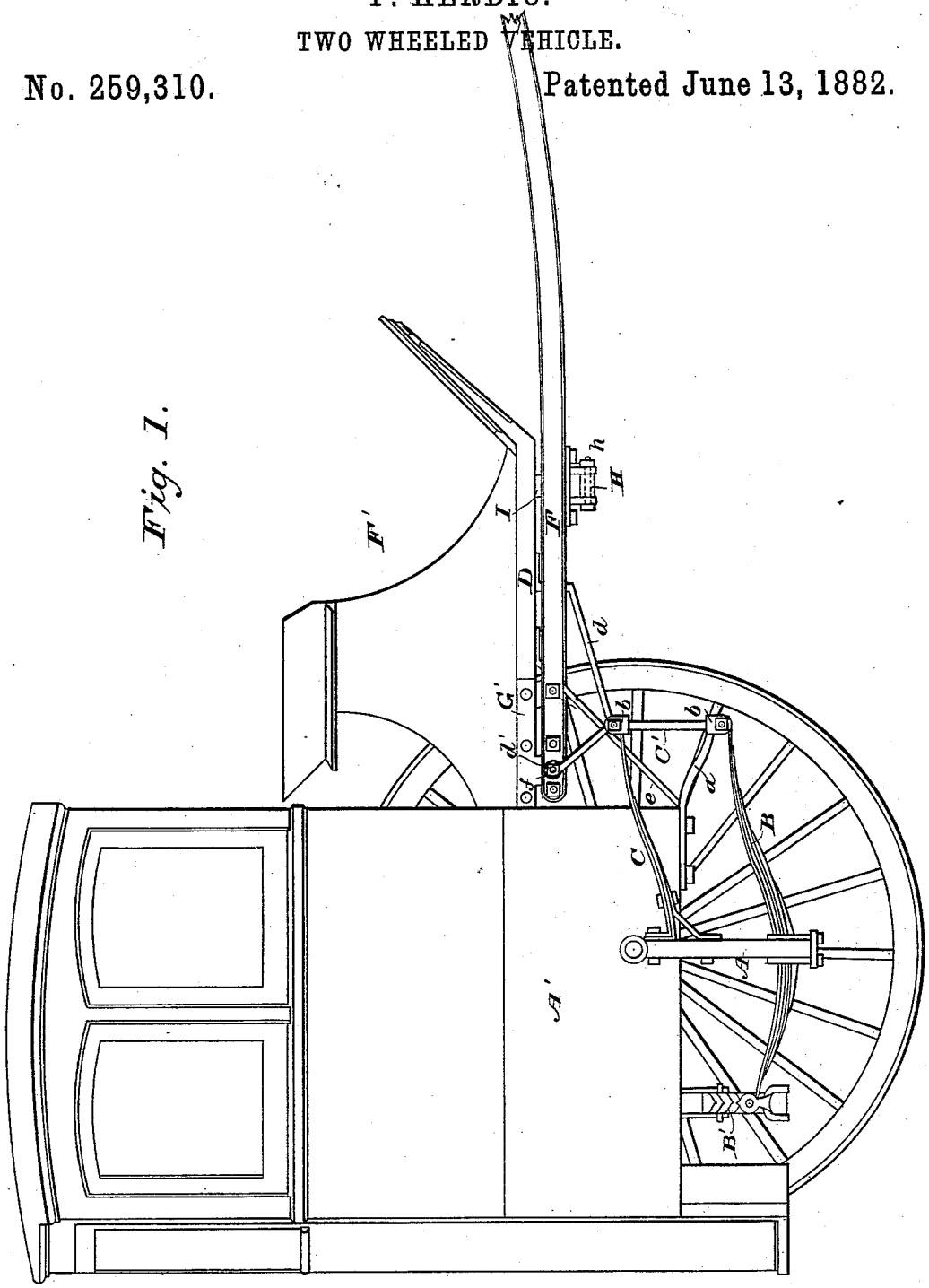
Figure 2:
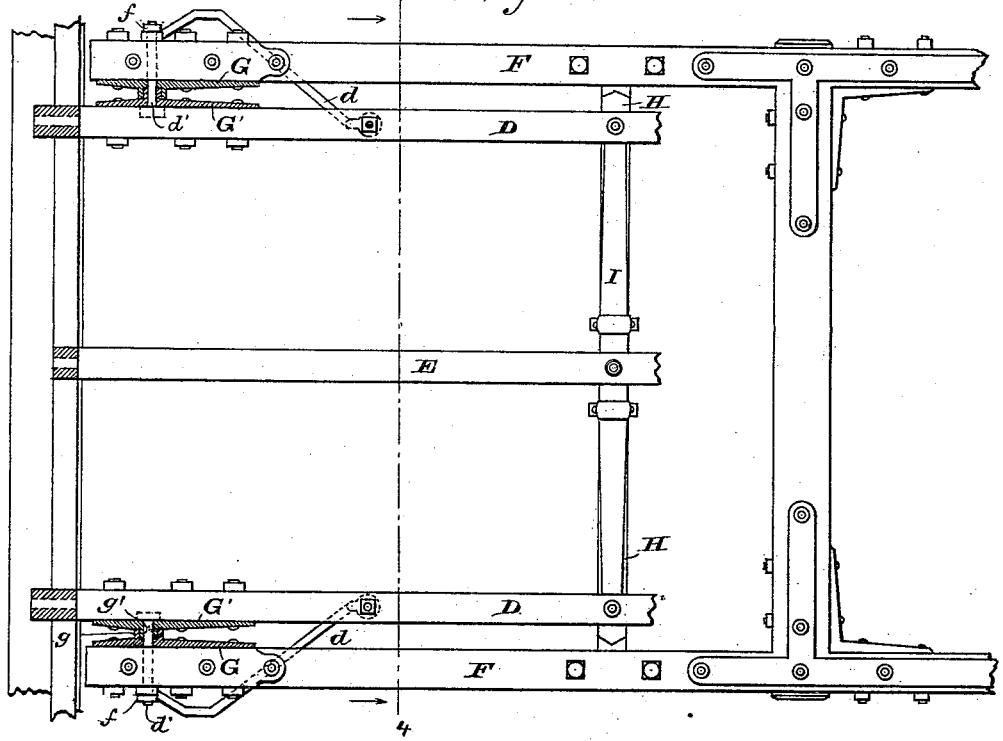
Figure 3:
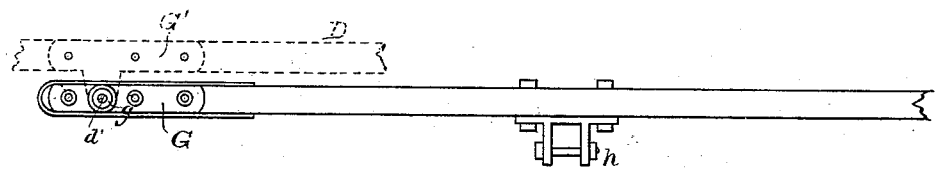
Figure 4:
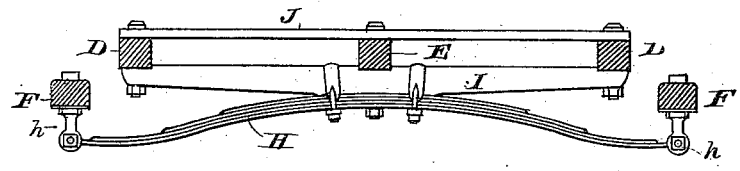

Figure 1 is a side elevation with the shafts partly broken away and one of the wheels removed. Fig. 2 is a plan view with parts in section, the driver's seat, boot, &c., being removed to show the shafts and connections beneath the seat; Fig. 3, a detail view, showing partly in full lines and partly in dotted lines some of the parts represented in Fig. 2. Fig. 4 is a detail view, partly in elevation and partly in section, on the line 4 4 of Fig. 2.

A suitable axle, preferably having its cranks A braced, as described in my Patent No. 242,318, and in sundry other Letters Patent of the United States granted to me, supports the body A' upon the wheels. Supporting-springs B, bracing-springs C, or their equivalents, and a rear spring, B', or its equivalent—such as a cross-bar or brackets—are all like or essentially similar to corresponding parts shown in my Patent No. 242,318. The drawings show but one main spring and one brace or bracing-spring, and these springs B C, as well as those which are not shown, respectively connect at their front ends with the lower and upper bearings or lugs, $b\ b$, at the ends of a cross-bar or bracket, C', as will readily be understood by reference to my before-recited patent. Instead of forming and supporting this lugged cross-bar exactly as in my said patent, I have found it preferable to have it connected with and supported from the body A' by means of brackets $a\ a$, (only one of which is shown,) which brackets are secured to or near the front bottom corners of the body, and respectively connect with the cross-bar near its respective ends and close to the lower lugs, $b$, thereof, with which the main or supporting springs are jointed at their front ends. The cross-bar C' at each end is connected with and supported from the seat-frame or beams D D of the boot-floor by angle-braces $d\ d$, the front or longer arms of which are secured to the beams inside the shafts, the shorter or rear arms having pivotal connection by bolts $d'\ d'$ with the shafts. A diagonal brace, $e$, extends from the front of the vehicle-body bottom to the central beam, E, of the seat-supporting framing. If preferred, two diagonal braces might connect the vehicle-body and seat-framing, and extend from near the front corners of the vehicle-bottom to the side beams, D D, instead of the one brace $e$, extending from the front of the vehicle-body bottom to the central beam.

The shafts F have pivotal connection at their rear ends in advance of the axle with the skeleton work or frame-timbers D D beneath the driver's seat F' and close to the body of the vehicle. The pivotal connection of the shafts to the vehicle is in this instance shown as formed by means of two plates, G G, secured to the shafts and provided with seats or sockets $g\ g$, and two plates, G' G', secured to the beams D D and provided with bosses or rounded lugs $g'\ g'$, fitting the sockets $g\ g$ and secured by the headed bolts $d'\ d'$ and nuts $f\ f$. As these bolts $d'\ d'$ serve also to connect the shafts with the bracing angle-brackets $d\ d$ of the spring-supporting cross-bar C', it will be obvious that vibration of the shafts about their pivotal connection with the vehicle is not interfered with.

To prevent the up-and-down motion of the draft-animal being imparted to an injurious or disagreeable degree to the vehicle-body and its load or the passengers in the vehicle, a spring-connection is made between the vehicle and the pivoted shafts. In this instance the connection is made by a cross-spring, H, connected with the framing D D E, and attached at its ends to clip-lugs or pendent supporting-brackets h h, secured to the shafts. The shaft-spring is shown as firmly clipped at its middle to a cross-bar, I, beneath the floor or bottom J of the boot, and secured to the beams D D E by bolts and nuts.

From the above description it will readily be seen that the motions of the horse between the shafts are imparted to the vehicle through the medium of a spring in advance of the vehicle-body, which greatly lessens vibration of the vehicle and avoids the violent shocks and annoying joltings to which the passengers in two-wheeled vehicles are ordinarily subjected, and also relieves the horse of the hurtful strains due to violent vibration of the shafts and constantly-occurring unyielding blows upon his back.

I claim as of my own invention—

1. The combination of a vehicle-body, shafts having pivotal connection therewith at their rear ends in advance of the axle, and the spring connecting the shafts and vehicle, substantially as and for the purpose hereinbefore set forth.

2. The combination of the axle, the springs, the body, the pivoted shafts, and the spring-connection between the vehicle and shafts in advance of the vehicle-body and shaft-pivots, substantially as and for the purpose hereinbefore set forth.

3. The combination of the vehicle-body, the seat-supporting framing, the shafts pivoted to said framing at their rear ends, and the spring connected with said framing and with the shafts in advance of their pivotal connection, substantially as and for the purpose hereinbefore set forth.

4. The combination of the shafts, the frame-beams, the lugged plates, the socketed plates, and the pivot-bolts, substantially as and for the purpose hereinbefore set forth.

5. The combination of the cranked axle, the vehicle-body, the supporting and bracing springs, the cross-bar provided with the upper and lower bearings or lugs at its end, the seat-supporting framing, the pivoted shafts, and the angle-braces pivoted to the shafts and connected with the seat-supporting framing, substantially as and for the purpose hereinbefore set forth.

In testimony whereof I have hereunto subscribed my name this 14th day of September, 1881.

PETER HERDIC.

Witnesses:
 THEO. G. HULETT,
 CHARLES A. GERLOCH.